(12) United States Patent
Cheng et al.

(10) Patent No.: US 11,784,719 B1
(45) Date of Patent: Oct. 10, 2023

(54) SYSTEMS AND METHODS FOR TUNING A POWER CHARACTERISTIC OF AN OPTICAL FREQUENCY COMB

(71) Applicant: CABLE TELEVISION LABORATORIES, INC., Louisville, CO (US)

(72) Inventors: Lin Cheng, Superior, CO (US); Luis Alberto Campos, Superior, CO (US); Haipeng Zhang, Broomfield, CO (US); Junwen Zhang, Broomfield, CO (US); Mu Xu, Broomfield, CO (US); Zhensheng Jia, Superior, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 0 days.

(21) Appl. No.: 17/220,616

(22) Filed: Apr. 1, 2021

Related U.S. Application Data

(60) Provisional application No. 63/003,367, filed on Apr. 1, 2020.

(51) Int. Cl.
*H04B 10/50* (2013.01)
*H04B 10/564* (2013.01)
*H04B 10/556* (2013.01)
*H04B 10/27* (2013.01)
*H04B 10/079* (2013.01)
*H04J 14/02* (2006.01)

(52) U.S. Cl.
CPC ... *H04B 10/5563* (2013.01); *H04B 10/07955* (2013.01); *H04B 10/27* (2013.01); *H04B 10/501* (2013.01); *H04B 10/506* (2013.01); *H04B 10/564* (2013.01); *H04J 14/0221* (2013.01)

(58) Field of Classification Search
None
See application file for complete search history.

(56) References Cited

U.S. PATENT DOCUMENTS

| | | | | | |
|---|---|---|---|---|---|
| 5,225,922 | A | * | 7/1993 | Chraplyvy | H04B 10/25073 398/94 |
| 5,566,381 | A | * | 10/1996 | Korotky | H04B 10/2537 398/147 |
| 6,178,036 | B1 | * | 1/2001 | Yao | H04B 10/2916 398/9 |
| 6,304,350 | B1 | * | 10/2001 | Doerr | H04J 14/0221 385/27 |

(Continued)

FOREIGN PATENT DOCUMENTS

CN 108566244 A * 9/2018 ........... H04B 10/077

*Primary Examiner* — Li Liu
(74) *Attorney, Agent, or Firm* — PdZ Patent Law, PLLC

(57) ABSTRACT

A method for tuning a power characteristic of an optical frequency comb includes controlling a modulating light source according to a plurality of modulation parameters to generate an optical frequency comb including a plurality of optical tones. Additionally, at least one of the plurality of modulation parameters is changed until a total power of the plurality of optical tones is greater than or equal to a minimum threshold value. Furthermore, at least one of the plurality of modulation parameters are changed until respective powers of each of the plurality of optical tones are within a predetermined proximity to respective target powers of each of the plurality of optical tones.

19 Claims, 8 Drawing Sheets

(56) References Cited

U.S. PATENT DOCUMENTS

| | | | | |
|---|---|---|---|---|
| 6,924,924 B2* | 8/2005 | Fujiwara | .......... | H04B 10/50593 |
| | | | | 385/11 |
| 8,023,775 B2* | 9/2011 | Sakamoto | ............. | G02F 1/2255 |
| | | | | 398/186 |
| 8,447,155 B1* | 5/2013 | Kuo | ........................ | G02F 1/353 |
| | | | | 385/24 |
| 9,209,927 B2* | 12/2015 | Yu | ........................ | H04J 14/0298 |
| 10,033,467 B2* | 7/2018 | Chien | ................... | H04B 10/548 |
| 10,845,544 B1* | 11/2020 | Seyedi | ................ | G02B 6/29395 |
| 2002/0196509 A1* | 12/2002 | Smilanski | ............ | H04J 14/005 |
| | | | | 398/194 |
| 2004/0100682 A1* | 5/2004 | Fujiwara | ............... | G02F 1/0121 |
| | | | | 385/24 |
| 2010/0135346 A1* | 6/2010 | Peters | .................... | H04J 14/02 |
| | | | | 372/29.011 |
| 2012/0219296 A1* | 8/2012 | Yu | ........................ | H04B 10/548 |
| | | | | 398/79 |
| 2012/0229886 A1* | 9/2012 | Chen | ................... | H04L 27/2697 |
| | | | | 359/326 |
| 2014/0105615 A1* | 4/2014 | Chien | ................... | H04B 10/548 |
| | | | | 398/188 |
| 2015/0139640 A1* | 5/2015 | Jopson | .................... | H04J 14/02 |
| | | | | 398/34 |
| 2015/0333827 A1* | 11/2015 | Okabe | ................... | H04B 10/548 |
| | | | | 398/38 |
| 2017/0170895 A1* | 6/2017 | D'Errico | ............. | H04J 14/0212 |
| 2018/0083599 A1* | 3/2018 | Kippenberg | ............ | H04J 14/06 |
| 2018/0109325 A1* | 4/2018 | Ozdemir | ................ | H01S 3/086 |
| 2019/0028191 A1* | 1/2019 | Xue | .................... | H04B 10/077 |
| 2020/0119813 A1* | 4/2020 | Zhang | .................. | H04B 10/63 |
| 2020/0322046 A1* | 10/2020 | Duan | ............... | H04B 10/07953 |
| 2021/0018814 A1* | 1/2021 | Gowda | ................... | G02B 5/20 |

* cited by examiner

SYSTEMS AND METHODS FOR TUNING A POWER CHARACTERISTIC OF AN OPTICAL FREQUENCY COMB

RELATED APPLICATIONS

This patent application claims benefit of priority to United States Provisional Patent Application Ser. No. 63/003,367, filed on Apr. 1, 2020, which is incorporated herein by reference.

BACKGROUND

An optical frequency comb is a series of discrete and equally spaced optical frequency lines, which may be referred to as optical tones. An optical frequency comb may be generated by modulating a laser. Optical frequency combs are used, for example, as carrier waves in optical communication networks and as optical frequency references.

DETAILED DESCRIPTION OF THE EMBODIMENTS

A conventional optical frequency comb source for use in an optical communication network is configured to generate an optical frequency comb having a flat, or ultra-flat, power characteristic, where each optical tone has essentially the same power level. However, a flat optical power characteristic may not be ideal. For example, link losses may vary along branches of the optical communication network, such that received optical power varies among receivers, even though the optical frequency comb has a flat power characteristic at its source. Additionally, required optical power may vary among receivers in the optical communication network, such that there is no single power level that is optimal for all receivers in the network. Furthermore, significant power may be lost when generating an optical frequency comb having a flat power characteristic, such as by attenuating power to realize the flat power characteristic.

Disclosed herein are methods and systems for tuning a power characteristic of an optical frequency comb, which at least partially overcome the above-discussed drawbacks associated with conventional optical frequency comb sources. Certain embodiments are configured to automatically tune a power characteristic of an optical frequency comb, such that power of each optical tone is individually set. Accordingly, power may vary among optical tones, instead of being uniform across optical tones. For example, the new systems may be configured to tune a power characteristic of an optical frequency comb to compensate for variations in link losses of an optical communication network, as well as to achieve desired power at receivers of the optical communication network. Additionally, the new methods and controllers may help achieve energy efficiency by eliminating power loss associated with generating an optical frequency comb with a flat power characteristic.

Figure 1:
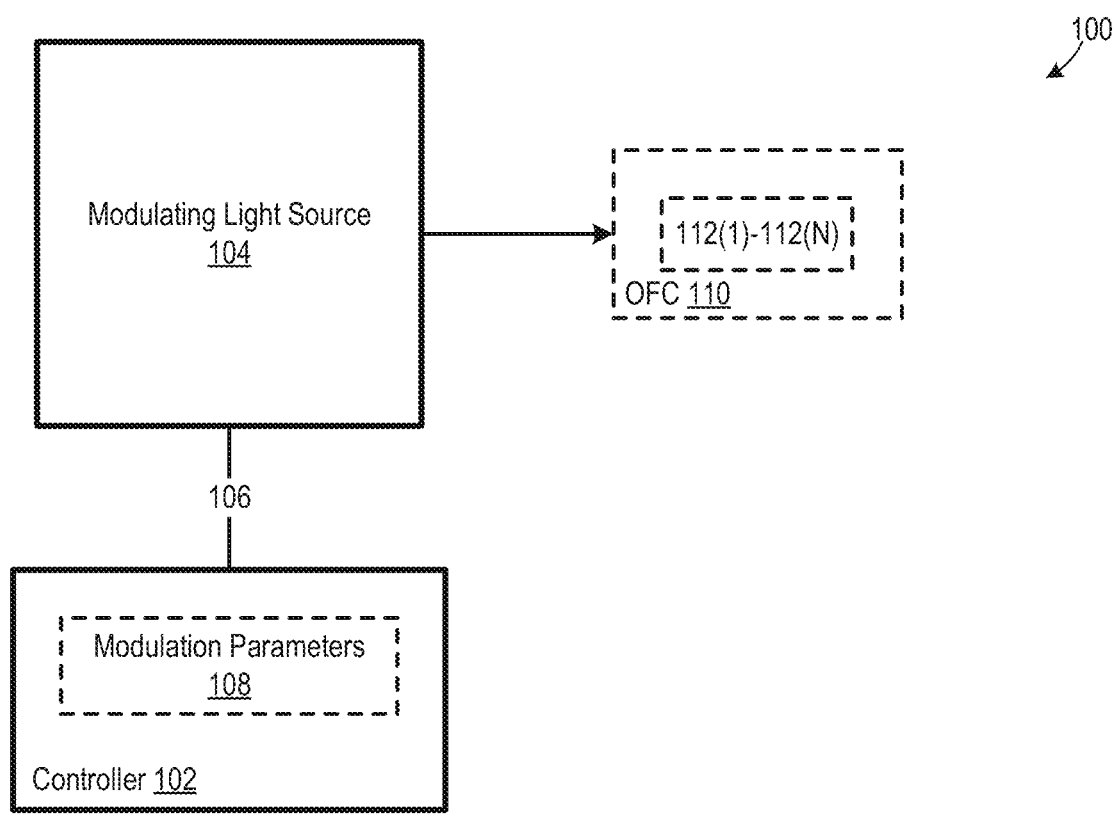
FIG. 1 is a block diagram of an optical frequency comb source including a controller configured to generate modulating parameters to tune a power characteristic of an optical frequency comb generated by the source, according to an embodiment.

FIG. 1 is a block diagram of an optical frequency comb source 100 including a controller 102 and a modulating light source 104, where controller 102 is configured to tune a power characteristic of an optical frequency comb. Controller 102 is communicatively coupled to modulating light source 104 by one or more communication lines 106. Although controller 102 and modulating light source 104 are illustrated in FIG. 1 as being separate elements, controller 102 and modulating light source 104 could be partially or fully integrated without departing from the scope hereof. Additionally, each of controller 102 and modulating light source 104 may include multiple sub-elements (not shown). For example, modulating light source 104 may include a laser (not shown) and one or more modulators (not shown), such as discussed below in the example embodiments of FIGS. 5 and 6. As another example, controller 102 may include a processor (not shown), a memory (not shown), and interface circuitry (not shown).

Figure 2:
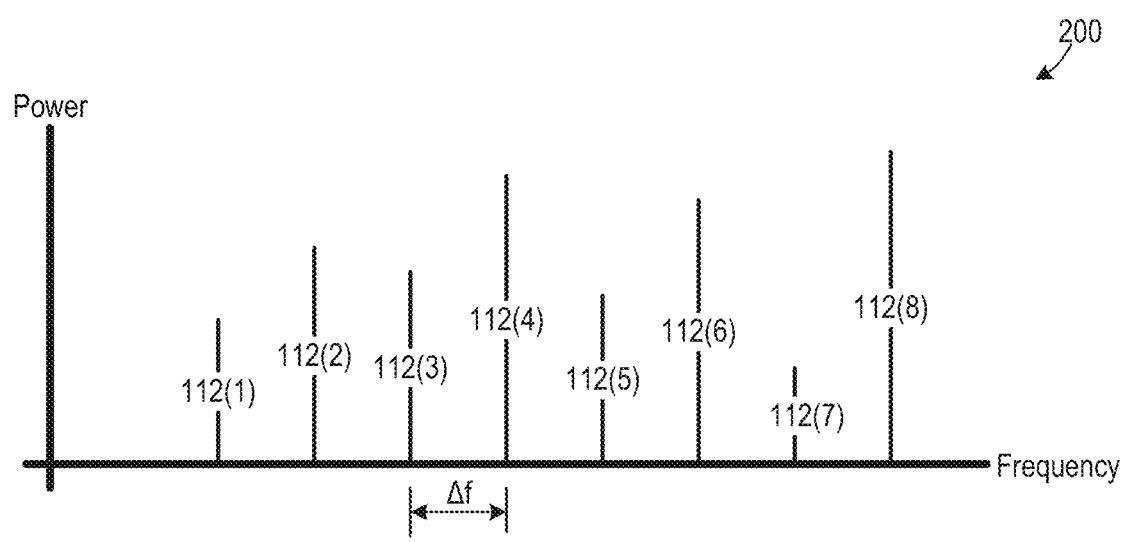
FIG. 2 is a graph illustrating one example of an optical frequency comb generated by the FIG. 1 source.

Controller 102 is configured to (1) generate modulation parameters 108, symbolically shown by a dashed box in FIGS. 1, and (2) control modulating light source 104 according to modulation parameters 108. Modulating light source 104 is configured to generate an optical frequency comb (OFC) 110 including N optical tones 112 according to modulation parameters 108, where N is an integer greater than one. Optical frequency comb 110 and its constituent optical tones 112 are symbolically shown by dashed-line boxes in FIG. 1. In this document, specific instances of an item may be referred to by use of a numeral in parentheses (e.g. optical tone 112(1)) while numerals without parentheses refer to any such item (e.g. optical tones 112). FIG. 2 is a graph 200 illustrating one example of optical frequency comb 110 where N is equal to eight. A horizontal axis of graph 200 represents frequency, and a vertical axis of graph 200 represents power. Graph 200 includes a respective bar showing relative frequency and power of each optical tone 112. Adjacent optical tones 112 are separated by a separation frequency Δf While FIG. 2 illustrates optical frequency comb 110 as including eight optical tones 112, the number optical tones 112 in optical frequency comb 110, as well as the respective power of each optical tone 112, may vary without departing from the scope hereof.

Referring again to FIG. 1, controller 102 is configured to generate modulation parameters 108 to tune a power characteristic of optical frequency comb 110, i.e., to set a respective power of each optical tone 112, such as to help optimize optical frequency comb 110 for its intended application. For example, in some embodiments, controller 102 is configured to (a) change at least one modulation parameter 108 until a total power of all optical tones 112 is greater than or equal to a minimum threshold value and (b) change at least one modulation parameter 108 until respective powers of optical tones 112 are within a predetermined proximity to respective target powers of the optical tones. Target powers of optical tones 112 are determined, for example, based on requirements of an application of source 100. For example, in some embodiments, such as discussed below in the example optical communication network of FIG. 7, source 100 generates optical tones 112 for use as carrier signals in an optical communication network, and each optical tone 112 is modulated and transmitted to a respective receiver of the optical communication network. In these embodiments, respective target powers of optical tones 112 are determined, for example, according to at least one of link losses, receiver specifications, and modulation order, of respective network branches handling optical tones 112. In some embodiments, controller 102 generates the target powers, while in some other embodiments, controller 102 receives the target powers from an external source.

Figure 3:
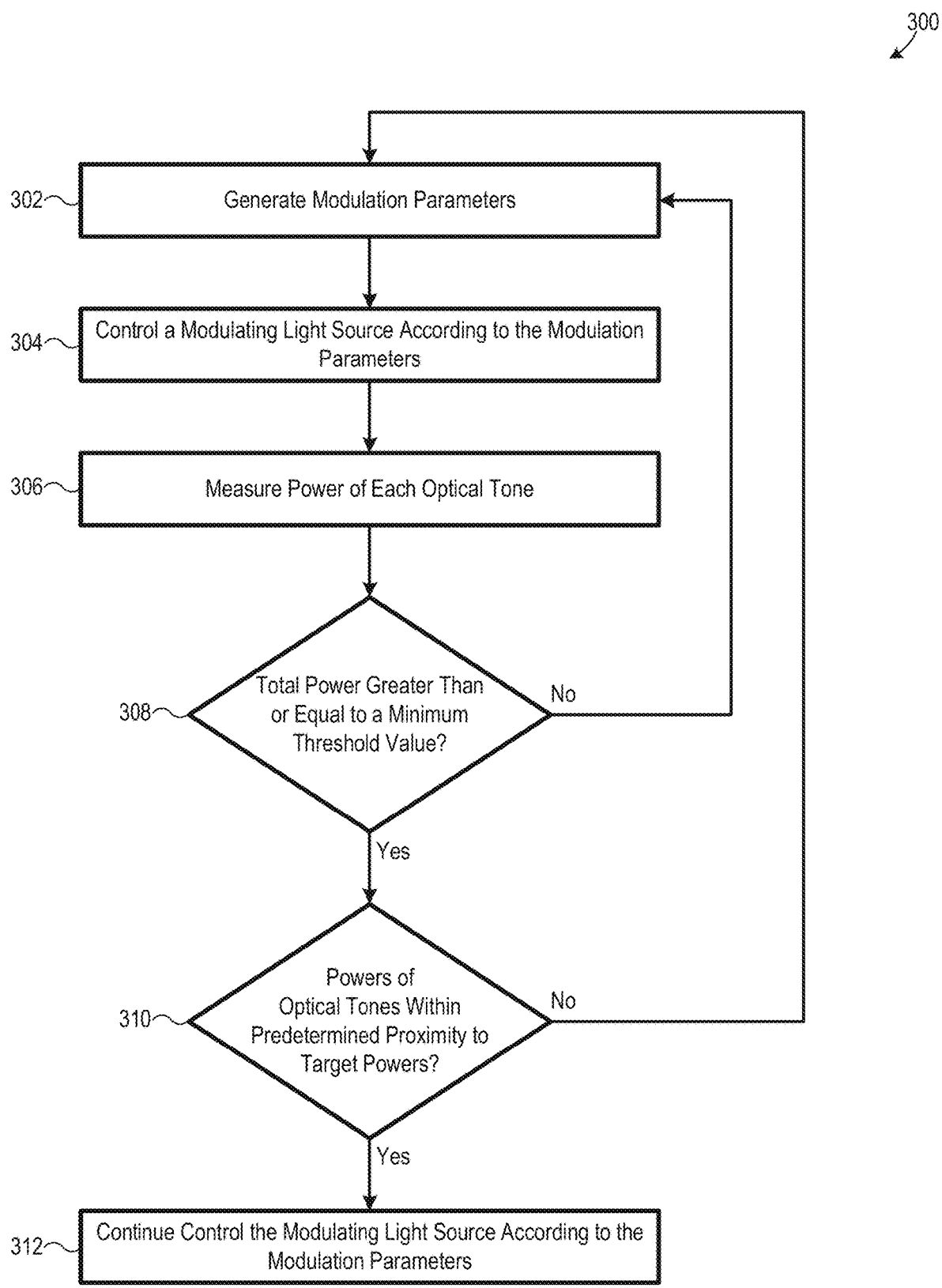
FIG. 3 is a flow chart of a method for tuning a power characteristic of an optical frequency comb, according to an embodiment.

FIG. 3 is a flow chart of a method 300 for tuning a power characteristic of an optical frequency comb, which is performed by some embodiments of optical frequency comb source 100. In a block 302 of method 300, controller 102 generates modulation parameters 108. In some embodiments, controller 102 is configured to generate modulation parameters 108 such that one or more of modulation parameters 108 have random values, where the random values are optionally constrained to be within one or more predetermined range of values. Additionally, in certain embodiments, controller 102 is configured to generate one or more modulation parameters 108 based on predetermined criteria. For example, in certain embodiments, controller 102 is configured to select modulation parameters 108 from a database of predetermined modulation parameters. The number and type of modulation parameters 108 generated by controller 102 is implementation-specific, but in certain embodiments, modulation parameters 108 include one or more of a bias value of modulating light source 104, an amplification value of an intensity modulating signal of modulating light source 104, an amplification value of a phase modulating signal of modulating light source 104, and a phase difference between the intensity modulating signal and the phase modulating signal.

In a block 304 of method 300, controller 102 controls modulating light source 104 according to modulation parameters 108 such that modulating light source 104 generates optical frequency comb 110 including N optical tones 112. In a block 306 of method 300, controller 102 measures power of each optical tone 112, such as from feedback information received from modulating light source 104 via communication lines 106, and/or from receivers (not shown) receiving optical tones 112. In a decision block 308 of method 300, controller 102 determines whether a total power of optical tones 112 is greater than or equal to a minimum threshold value. The minimum threshold value is, for example, a minimum power level required to achieve acceptable operation of a communication network including optical frequency comb source 100. If the result of decision block 308 is yes, method 300 proceeds to decision block 310. However, if the result of decision block 308 is no, blocks 302-308 are repeated until decision block 308 is satisfied, i.e., until total power of optical tones 112 is greater than or equal to the minimum threshold value. Modulation parameters 108 are generated each time block 302 is executed, such that one or more modulation parameters 108 are changed each time block 302 is executed.

Once the decision block 308 is satisfied, method 300 proceeds to decision block 310 where controller 102 determines whether respective powers of optical tones 112 are within a predetermined proximity to respective target powers of optical tones 112. If the result of decision block 308 is yes, method 300 proceeds to block 312. However, if the result of decision block 310 is no, blocks 302-310 are repeated until decision block 310 is satisfied, i.e., until respective powers of optical tones 112 are within a predetermined proximity to respective target powers of optical tones 112. As discussed above, modulation parameters 108 are generated each time that block 302 is executed, such that one or more modulation parameters 108 are changed each time that block 302 is executed.

Once decision block 310 is satisfied, method 300 proceeds to block 312 where controller 102 continues to control modulating light source 104 according to the most-recent modulation parameters 108, i.e., the modulation parameters 108 generated during the most-recent execution of block 302. Controller 102 executes method 300, for example, during commissioning of a communication network including optical frequency comb source 102 or in response to a change in configuration of such communication network.

Method 300 can be considered to include a first control loop and a second control loop. The first control loop includes blocks 302-308, and the second control loop includes blocks 302-310. Thus, the second control loop includes the first control loop, such that the first control loop is executed one or more times during execution of the second control loop. In an alternate embodiment, blocks 308 and 310 are swapped, such that the first control loop includes blocks 302, 304, 306, and 310, and the second control loop includes blocks 302-308.

Figure 4:
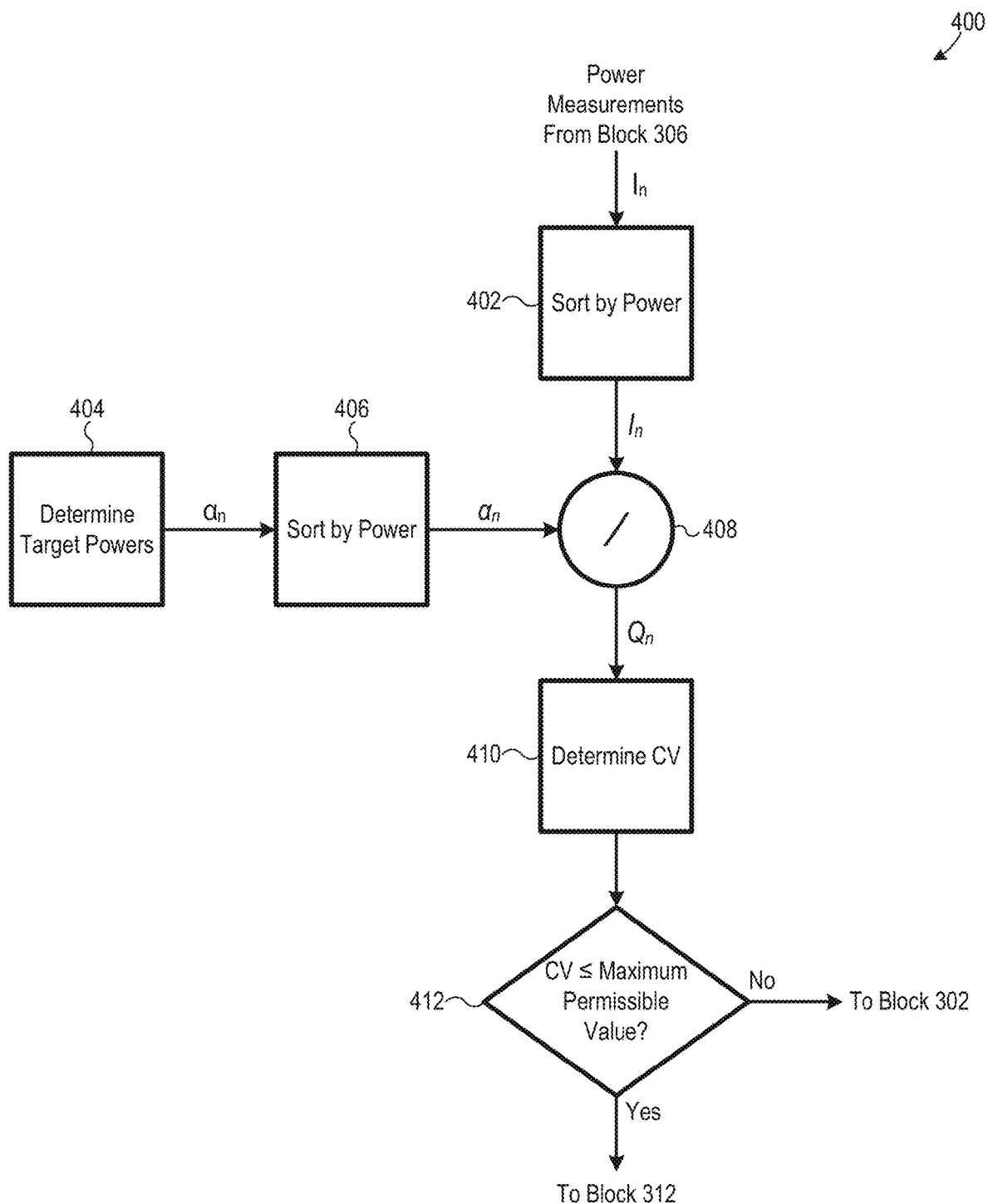
FIG. 4 is a flow chart of a method for determining whether respective powers of optical tones are within a predetermined proximity to respective target powers of the optical tones, according to an embodiment.

FIG. 4 is a flow chart of a method 400 for determining whether respective powers of optical tones are within a predetermined proximity to respective target powers of the optical tones. Method 400 is one possible embodiment of decision block 310 of method 300. A block 402 of method 400 receives measured powers $I_n$ from block 306 of method 300. The subscript n in FIG. 4 is an index ranging from 1 to N, which identifies a particular optical tone 112. Accordingly, $I_1$ is power of optical tone 112(1), $I_2$ is power of optical tone 112(2), and so on. In some embodiments, powers $I_n$ are relative power values, instead of absolute power values. In block 402, controller 102 sorts measured powers $I_n$ by power, as by ascending power or by descending power.

In a block 404 of method 400, controller 102 determines a respective target power $\alpha_n$ for each optical tone 112, such that there is a respective target power $\alpha_n$ for each measured power value $I_n$. Target powers $a_n$ are, for example, relative target powers instead of absolute target powers. In some embodiments, controller 102 determines each target power $\alpha_n$ at least partially based on a respective loss, a respective receiver power requirement, and/or a respective modulation order of a communication network branch associated with the corresponding optical tone 112. For example, Table 1 below lists example target powers $\alpha_n$ of an embodiment of optical frequency comb source 100 where N is equal to 19 and where source 100 is intended for use in an optical communication network. Table 1 lists communication link loss, relative noise, and modulation order, for a respective communication network branch associated each optical tone 112. For example, link loss, relative noise, and modulation order of a first network branch associated with first optical tone 112(1) are 7 dB, 2 dB, and 4, respectively. As another example, link loss, relative noise, and modulation order of a second network branch associated with second optical tone 112(2) are 9 dB, 2 dB, and 4, respectively. As evident from Table 1, target power $\alpha_n$ varies according to link loss, relative noise, and modulation order. For example, in some embodiments, target power $\alpha_n$ increases with increasing link loss, relative noise, and/or modulation order.

It should be appreciated that the methods of FIGS. 3 and 4 advantageously do not require modeling information on modulators within modulating light source 104. Additionally, the methods of FIGS. 3 and 4 do not require use of data processing techniques which may become trapped at local minima, such as solving a non-linear least-squares problem or performing a gradient descent technique, thereby helping achieve robust power characteristic tuning.

Figure 5:
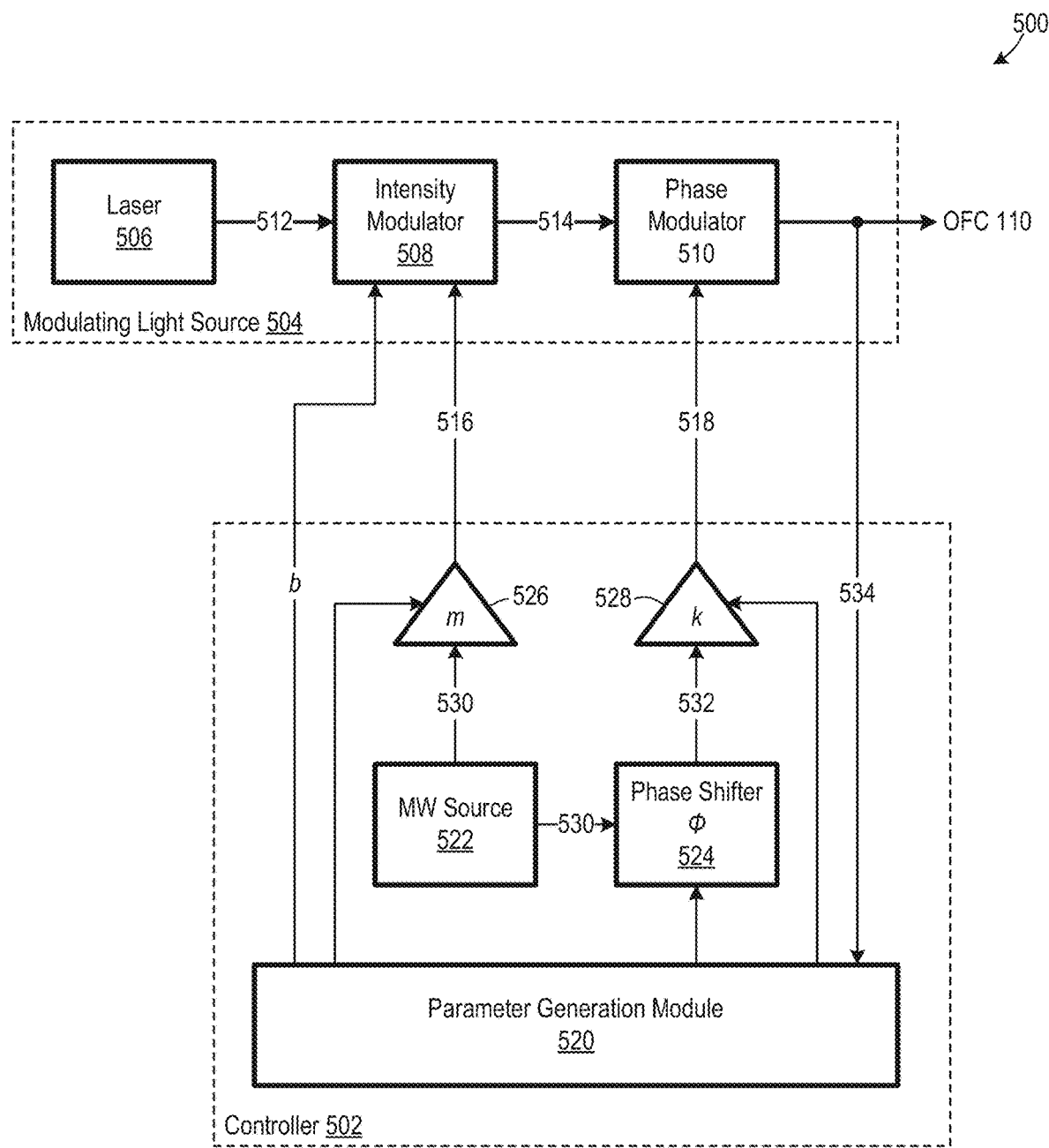
FIG. 5 is a block diagram of an embodiment of the FIG. 1 optical frequency comb source where a modulating light source includes a laser and two modulators.

FIG. 5 is a block diagram of an optical frequency comb source 500, which is an embodiment of optical frequency comb source 100 of FIG. 1 where (1) controller 102 is

TABLE 1

| | Tone No. | | | | | | | | | | | | | | | | | | |
|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 19 |
| Link loss (dB) | 7 | 9 | 10 | 9 | 7 | 14 | 9 | 7 | 9 | 9 | 10 | 7 | 14 | 14 | 14 | 14 | 10 | 10 | 14 |
| Relative Noise (dB) | 2 | 2 | 1 | 3 | 1 | 0 | 0 | 3 | 1 | 2 | 3 | 2 | 1 | 2 | 3 | 3 | 2 | 2 | 1 |
| Mod. Order | 4 | 4 | 4 | 4 | 16 | 4 | 16 | 16 | 16 | 16 | 16 | 64 | 16 | 16 | 16 | 16 | 64 | 64 | 64 |
| $\alpha_n$ (dB) | 0 | 2 | 2 | 3 | 5 | 5 | 6 | 7 | 7 | 8 | 10 | 12 | 12 | 13 | 14 | 14 | 15 | 15 | 18 |

Referring again to FIG. 4, controller 102 sorts target powers $\alpha_n$ by power, such as by ascending power or by descending power, in a block 406 of method 400. In a block 408 of method 400, controller 102 divides each measured power $I_n$ by its respective target power $\alpha_n$ to generate a respective power quotient $Q_n$ for the measured power/target power pair. For example, controller 102 divides measured power $I_1$ by target power $\alpha_1$ to generate power quotient $Q_1$ for optical tone 112(1), and controller 102 divides measured power $I_2$ by target power $\alpha_2$ to generate power quotient $Q_2$ for optical tone 112(2). In a block 410 of method 400, controller 102 generates a coefficient of variation at least partially based on power quotients $Q_n$, where the coefficient of variation expresses extent that measured powers $I_n$ vary from corresponding target powers $\alpha_n$. In some embodiments, controller 102 determines the coefficient of variation (CV) by executing EQN. 1 below:

$$CV = \frac{\sqrt{N \sum_{n=1}^{N} \left(Q_n - \frac{1}{N}\sum_{n=1}^{N} Q_n\right)^2}}{\sum_{n=1}^{N} Q_n} \quad \text{EQN. 1}$$

In decision block 412 of method 400, controller 102 determines whether the coefficient of variation determined in step 410 is less than or equal to a maximum permissible coefficient of variation. The maximum permissible coefficient of variation is selected, for example, as a compromise between (1) achieving minimal variation between measured powers and target powers and (2) minimizing time required for controller 102 to perform methods 300 and 400. If the result of decision block 412 is yes, method 400 proceeds to block 312 of method 300, and if the result of decision block 412 is no, method 400 proceeds to block 302 of method 300. In some alternate embodiments, such as in embodiments where source 100 is used in an optical communication networks using multiple colors of light, blocks 402 and 406 are omitted, such that there is no sorting of measured powers $I_n$ and target power $\alpha_n$ before generating power quotients $Q_n$.

embodied by a controller 502 and (2) modulating light source 104 is embodied by a modulating light source 504. Modulating light source 504 includes a laser 506, an intensity modulator 508, and a phase modulator 510. Laser 506 is configured to generate an optical signal 512, and intensity modulator 508 is configured to modulate intensity of optical signal 512 to generate an intensity modulated optical signal 514. Intensity modulator 508 is configured modulate intensity of optical signal 512 in response to a bias value b from controller 502, as well as from an intensity modulating signal 516 from controller 502. Phase modulator 510 is configured to modulate phase of intensity modulated optical signal 514 in response to a phase modulating signal 518 from controller 502, to generate optical frequency comb 110.

Controller 502 includes a parameter generation module 520, a microwave (MW) source 522, a phase shifter 524, an amplifier 526, and an amplifier 528. Microwave source 522 is configured to generate a microwave signal 530 for use by both intensity modulator 508 and phase modulator 510. Amplifier 526 is configured to amplify microwave signal 530 by an amplification value set by parameter generation module 520 to generate intensity modulating signal 516 having an amplitude m. Phase shifter 524 is configured to shift phase of microwave signal 530 by a value of Φ, which is set by parameter generation module 520, to generate signal 532. Amplifier 528 is configured to amplify signal 532 by an amplification value set by parameter generation module 520 to generate phase modulating signal 518 having an amplitude k. A difference in phase between phase modulating signal 518 and amplitude modulating signal 516 is equal to Φ.

Parameter generation module 520 is formed, for example, of analog and/or digital electronic circuitry (not shown). In some embodiments, parameter generation module 520 includes a processor (not shown) configured to execute instructions, such as in the form of software and/or firmware, stored in a memory (not shown) to perform at least some functions of parameter generation module 520. Parameter generation module 520 is configured to generate modulation parameters b, m, k, and Φ, which are embodiments of modulation parameters 108 of FIGS. 1, to (1) cause modulating light source 504 to generate optical frequency comb 110 and (2) tune a power characteristic of optical frequency comb 110 110. In some embodiments, parameter generation module 520 is configured to execute method 300 of FIG. 3, optionally along with method 400 of FIG. 4, to tune the power characteristic of optical frequency comb 110. In these embodiments, modulation parameters b, m, k, and Φ are generated in block 302 of method 300. Parameter generation module 520 is configured to sample optical frequency comb 110 via a feedback signal 534, such as to determine power of optical tones 512. Two or more elements of controller 502 may be at least partially combined without departing from the scope hereof.

Electric field $E_{comb}$ of optical frequency comb 110 at the output of modulating light source 504 can be expressed by EQN. 2 below, where f is frequency of microwave signal 530 and $V_\pi$ is a halfwave voltage representing a difference between a maximum output signal power and a minimum output signal power. Additionally, optical tone powers $I_n$ can be determined from EQN. 3 below, where F represents a Fourier transform operator.

$$E_{comb} \propto \sin\left(\frac{\pi}{2V_\pi}(b + m\cos(2\pi ft))\right)\exp(-jk\cos(2\pi ft + \Phi)) \quad \text{EQN. 2}$$

$$I_n = |F(E_{comb})(nf)|^2 \quad \text{EQN. 3}$$

Figure 6:
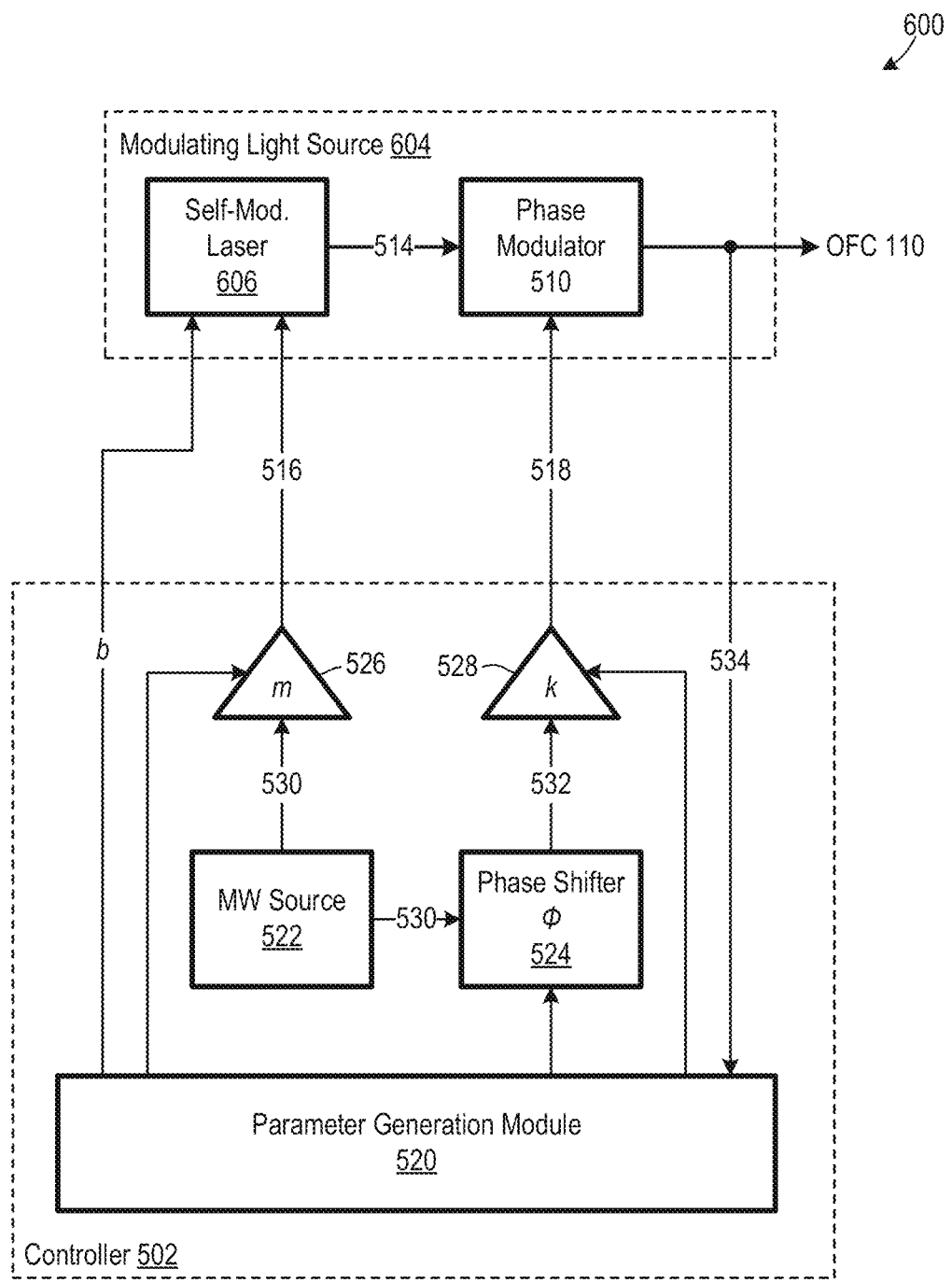
FIG. 6 is a block diagram of an alternate embodiment of the FIG. 5 optical frequency comb source.

The relative locations of intensity modulator 508 and phase modulator 510 in modulating light source 504 may be swapped. Furthermore, intensity modulator 508 could be replace with a second phase modulator, or phase modulator 510 could be replaced with a second intensity modulator, with appropriate changes to controller 502. Moreover, laser 506 and intensity modulator 508 could be replaced with a self-modulating laser. For example, FIG. 6 is a block diagram of an optical frequency comb source 600, which is an alternate embodiment of optical frequency comb source 500 of FIG. 5 where modulating light source 504 is replaced with a modulating light source 604. Modulating light source 604 includes a self-modulating laser 608 in place of the combination of laser 506 and intensity modulator 508, such that self-modulating laser 608 directly generates intensity modulated optical signal 514 in response to bias value b and intensity modulating signal 516.

Figure 7:
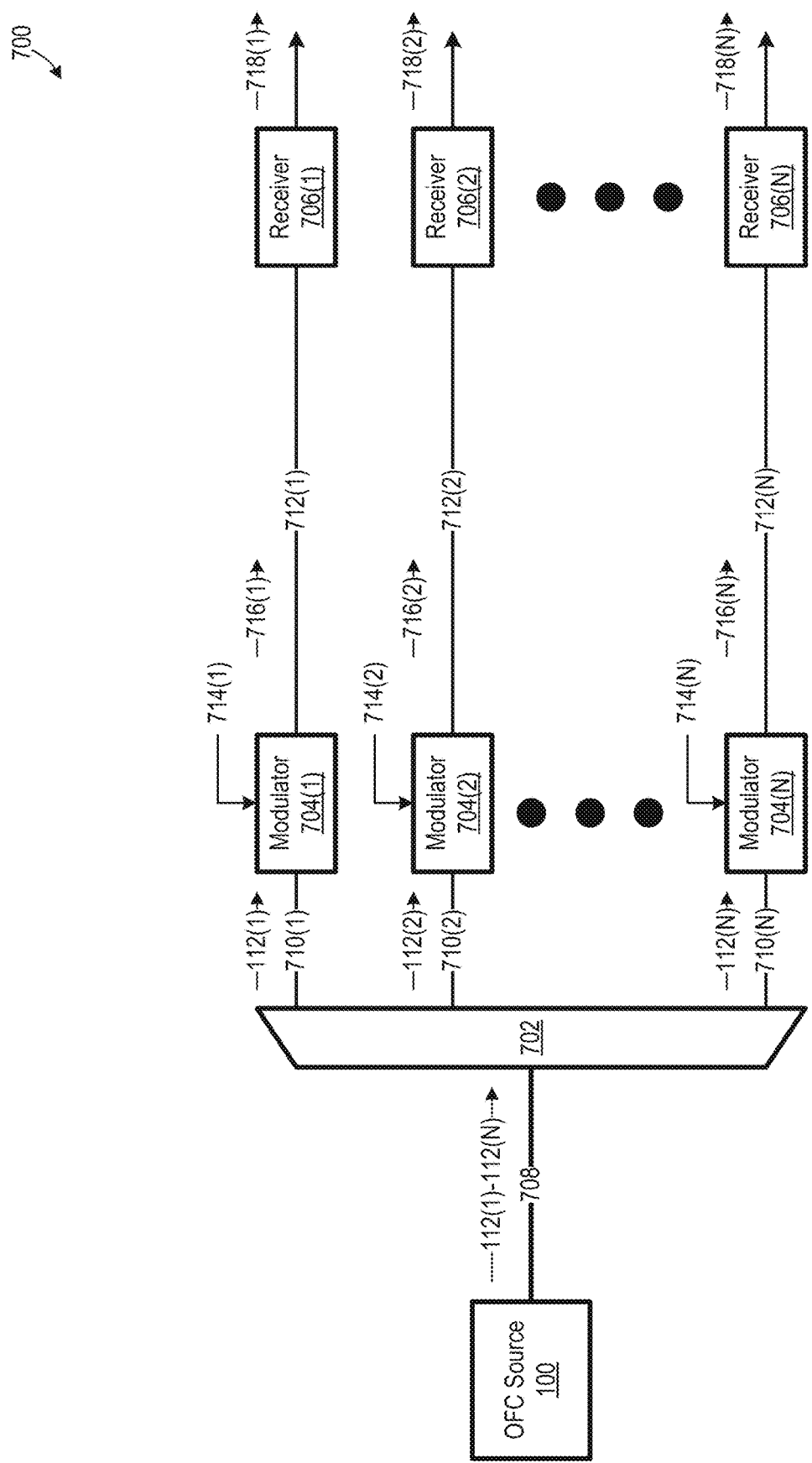
FIG. 7 is a block diagram of an optical communication system including an instance of the FIG. 1 optical frequency comb source, according to an embodiment.

FIG. 7 illustrates one possible application of optical frequency comb source 100. Specifically, FIG. 7 is a block diagram of an optical communication network 700 including an instance of optical frequency comb source 100, a coupling device 702, N modulators 704, N receivers 706, an optical cable 708, N optical cables 710, and N optical cables 712. Optical cable 708 communicatively couples optical frequency comb source 100 to coupling device 702, and optical cable 708 therefore transports each optical tone 112 to coupling device 702. Coupling device 702 is configured to direct each optical tone 112 to a respective optical cable 710 for transporting to a respective modulator 704. In some embodiments, coupling device 702 includes a splitter or a wavelength-selective switching device.

Each modulator 704 is configured to modulate its respective optical tone 112 according to a communication signal 714 to generate a modulated signal 716. In some embodiments, modulated signals 716 comply with one or more of an Ethernet passive optical network (EPON) protocol, a radio frequency of over glass (RFOG or RFoG) protocol, a Gigabit-capable passive optical network (GPON) protocol, a Data Over Cable Service Interface Specification (DOCSIS) protocol, a cellular communication protocol (e.g., a Long Term Evolution (LTE) communication protocol, a fifth generation (5 G) new radio (NR) communication protocol, and/or a sixth generation 6 G communication protocol), a WiFi communication protocol, a satellite communication protocol, a Bluetooth communication protocol, a free space optical communication protocol, a home networking protocol (e.g. a Multi-Media over Coax (MoCA) protocol or a HomePNA (G.hn) protocol) a digital subscriber line (DSL) protocol, and any variations, improvements, and/or evolutions of the foregoing. Each optical cable 712 communicatively couples a respective modulator 704 and receiver 706 pair, such that each optical cable 712 transports a respective modulated signal 716 to a respective receiver 706. Each receiver 706 is configured to convert its respective modulated signal 716 from the optical domain to the electrical domain to generate an electrical modulated signal 718.

In some embodiments of optical communication network 700, optical frequency comb source 100 is configured to individually determine each target power $\alpha_n$, at least partially based on properties of optical communication network 700, such as based on one or more of link losses between optical filter comb source 100 and receivers 706, sensitivity of receivers 706, and modulation order of modulators 704. For example, assume that a link loss between optical frequency comb source 100 and receiver 706(1) is greater than a link loss between optical frequency comb source 100 and receiver 706(2). In this example scenario, optical frequency comb source 100 may determine that target power $\alpha_1$ associated with optical tone 112(1) should be larger than target power $\alpha_2$ associated with optical tone 112(2), to compensate for the relatively large link loss associated experienced by optical tone 112(1). As another example, assume that receiver 706(2) has a relatively low sensitivity. In this example scenario, optical frequency comb source 100 may determine that target power $\alpha_2$ associated with optical tone 112(2) should be relatively large to compensate for the low sensitivity of receiver 706(2). As yet another example, assume that modulator 704(1) operates with a low modulating order. In this example scenario, optical frequency comb source 100 may determine that target power $\alpha_1$ associated with optical tone 112(1) should be relatively low due to the low modulating order of modulator 704(1).

Experimental Results

Figure 8:
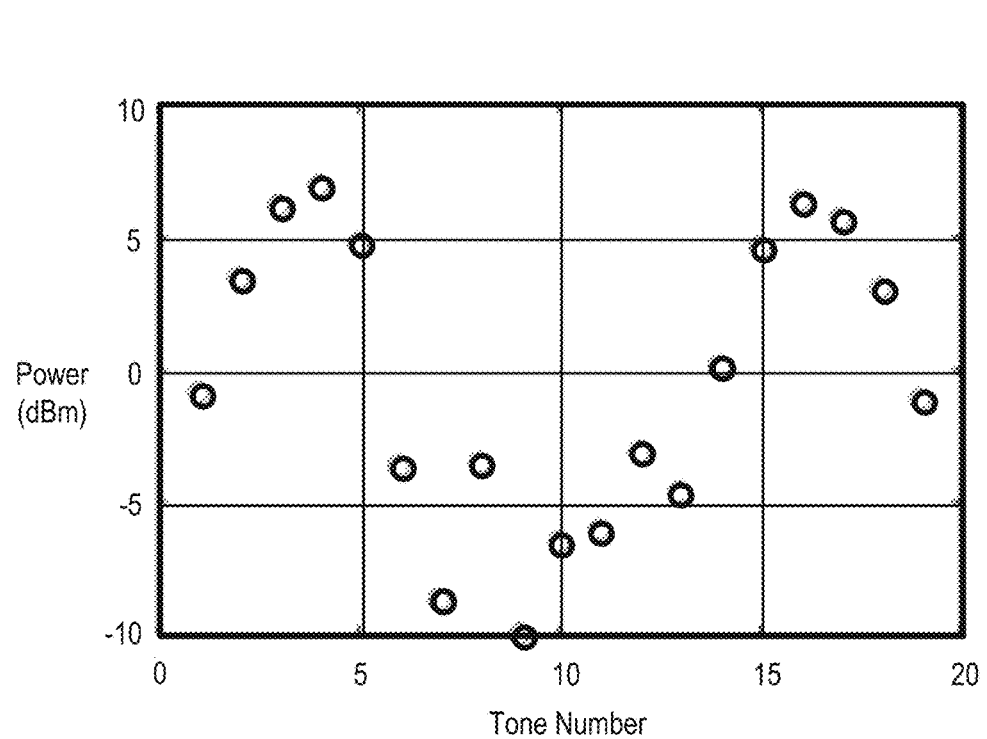
FIG. 8 is a graph showing simulation results of one embodiment of the FIG. 1 optical frequency comb source.
Figure 9:
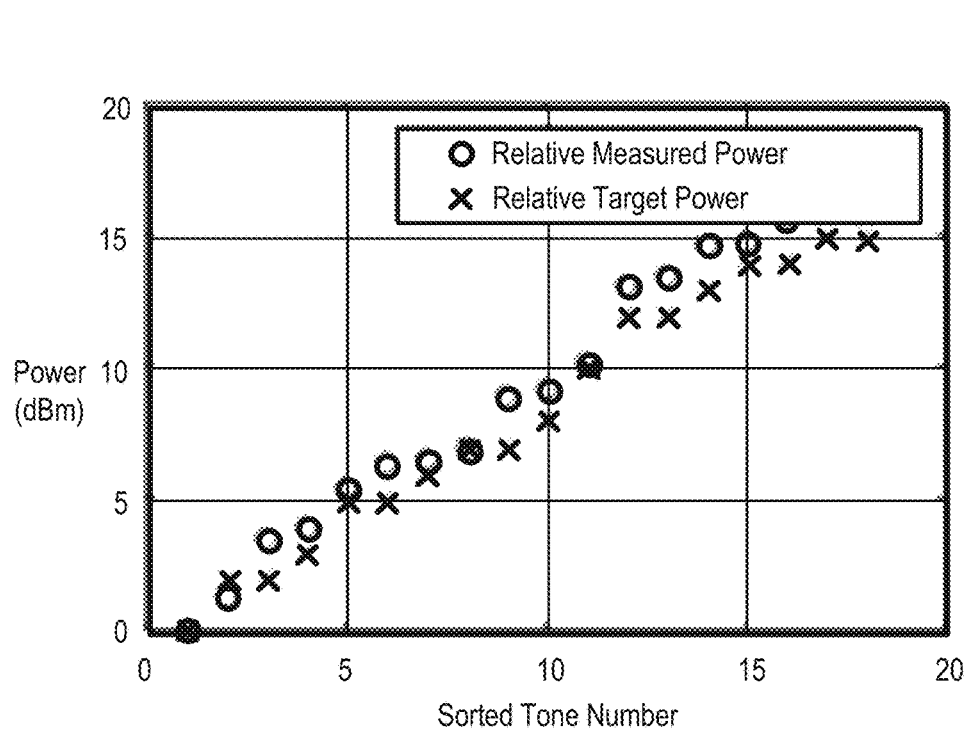
FIG. 9 is another graph showing simulation results of one embodiment of the FIG. 1 optical frequency comb source.
Figure 10:
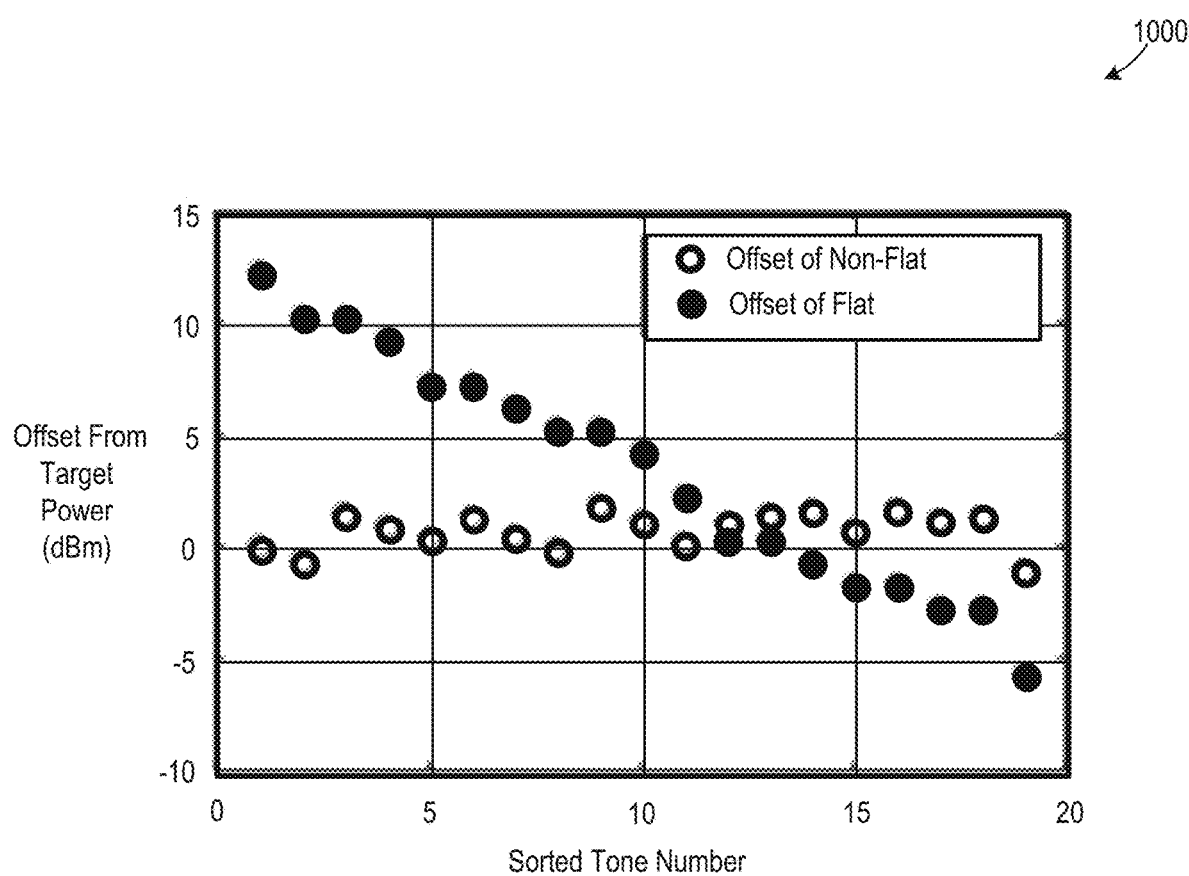
FIG. 10 is a graph showing simulation results of one embodiment of the FIG. 1 optical frequency comb source along with simulation results of a conventional optical frequency comb source.

Discussed below with respect to FIGS. 8-10 are simulation results of an embodiment of optical frequency comb source 100 where N is equal to 19 and where the source is configured to execute the methods of FIGS. 3 and 4. It is realized, though, that optical filter comb source 100 is not limited to operating according to the simulation results below.

FIG. 8 is a graph 800 of relative power versus tone number of an embodiment of optical frequency comb source 100. Each circle in graph 800 represents measured power of a respective optical tone 112. As evident from FIG. 8, optical tones 112 have a non-flat power characteristic—that is, power varies among the optical tones. FIG. 9 is a graph 900 of relative power versus tone number under the same conditions as FIG. 8 after sorting of the optical tones by power. Additionally, FIG. 9 includes a respective relative target power, represented by the letter "X", for each measured optical tone power. As evident from the FIG. 9, measured optical tone powers are close to their respective target powers, which shows that the effectiveness of the methods of FIGS. 3 and 4.

FIG. 10 is a graph of offset from target power versus tone number for two different optical frequency comb sources having a same total power. The white-filled circles correspond to an embodiment of optical frequency comb source 100 where N is equal to 19 and where the source is configured to execute the methods of FIGS. 3 and 4. The black-filled circles correspond to an optical frequency comb source configured to have a flat power characteristic. As shown in FIG. 10, the embodiment of optical frequency comb source 100 has minimal offset, or in other words, optical tone power is close to target optical tone power. Indeed, the largest offset value is only 1.7 dB. The optical frequency comb source with a flat power characteristic, in contrast, has substantial offset at many of its optical tones and a large maximum offset value of 12.3 dB. Accordingly, the methods of FIGS. 3 and 4 can substantially reduce offset, thereby improving performance, reducing power consumption, and potentially relaxing receiver sensitivity requirements.

Features described above may be combined in various ways without departing from the scope hereof. The following examples illustrate some possible combinations.

(A1) A method for tuning a power characteristic of an optical frequency comb includes (a) controlling a modulating light source according to a plurality of modulation parameters to generate an optical frequency comb including a plurality of optical tones, (b) changing at least one of the plurality of modulation parameters until a total power of the plurality of optical tones is greater than or equal to a minimum threshold value, (c) changing at least one of the plurality of modulation parameters until respective powers of the plurality of optical tones are within a predetermined proximity to respective target powers of the plurality of optical tones.

(A2) In the method denoted as (A1), changing the at least one of the plurality of modulation parameters until the total power of the plurality of optical tones is greater than or equal to the minimum threshold value may include changing a first one of the plurality of modulation parameters to a first random value.

(A3) In the method denoted as (A2), the first random value may be a first random value within a predetermined range of values.

(A4) In any one of the methods denoted as (A1) through (A3), changing the at least one of the plurality of modulation parameters until respective powers of the plurality of optical tones are within the predetermined proximity to respective target powers of the plurality of optical tones may include changing a second one of the plurality of modulation parameters to a second random value.

(A5) In the method denoted as (A4), the second random value may be a second random value within a predetermined range of values.

(A6) In any one of the methods denoted as (A1) through (A5), the plurality of modulation parameters may include at least one of a bias value of the modulating light source, an amplification value of an intensity modulating signal of the modulating light source, an amplification value of a phase modulating signal of the modulating light source, and a phase difference between the intensity modulating signal and the phase modulating signal.

(A7) Any one of the methods denoted as (A1) through (A6) may further include (1) performing step (b) as a first control loop and (2) performing step (c) as a second control loop including the first control loop.

(A8) In any one of the methods denoted as (A1) through (A7), changing the at least one of the plurality of modulation parameters until the respective powers of the plurality of optical tones are within the predetermined proximity to the respective target powers of the plurality of optical tones may include changing the at least one of the modulation parameters until a coefficient of variation between the respective powers of the plurality of optical tones and the respective target powers of the plurality of optical tones is less than or equal to a maximum permissible coefficient of variation.

(A9) Any one of the methods denoted as (A1) through (A8) may further include determining the respective target powers of the plurality of optical tones according to least one of link loss, receiver specifications, and modulation order, for each of the plurality of optical tones.

(B1) A method for tuning a power characteristic of an optical frequency comb includes (a) controlling a modulating light source according to first modulation parameters to generate a first optical frequency comb including a plurality of first optical tones, (b) measuring power of each of the plurality of first optical tones, (c) determining that a total power of the plurality of first optical tones is less than a minimum threshold value, (d) in response to determining that the total power of the plurality of first optical tones is less than the minimum threshold value, generating second modulation parameters, (e) controlling the modulating light source according to the second modulation parameters to generate a second optical frequency comb including a plurality of second optical tones, (f) measuring power of each of the plurality of second optical tones, (g) determining that a total power of the plurality of second optical tones is greater than or equal to the minimum threshold value, (h) determining that respective powers of the plurality of second optical tones are within a predetermined proximity to respective target powers of the plurality of second optical tones, and (i) in response to determining that the respective powers of the plurality of second optical tones are within the predetermined proximity to the respective target powers of the plurality of second optical tones, continuing to control the modulating light source according the second modulation parameters.

(B2) In the method denoted as (B1), determining that the respective powers of the plurality of second optical tones are within the predetermined proximity to the respective target powers of the plurality of second optical tones may include (1) dividing the respective powers of the plurality of second optical tones by the respective target powers of the plurality of second optical tones, to generate respective power quotients of the plurality of second optical tones, (2) determining a coefficient of variation based at least partially on the respective power quotients of the plurality of second optical tones, (3) comparing the coefficient of variation to a maximum permissible coefficient of variation, and (4) determining that the respective powers of the plurality of second optical tones are within the predetermined proximity to the respective target powers of the plurality of second optical tones in response to the coefficient of variation being less than or equal to the maximum permissible coefficient of variation.

(B3) The method denoted as (B2) may further include, before dividing the respective powers of the plurality of second optical tones by the respective target powers of the plurality of second optical tones, sorting the plurality of second optical tones and the respective target powers of the plurality of second optical tones according to power level.

(B4) In any one of the methods denoted as (B1) through (B3), generating the second modulation parameters may include randomly generating at least one of the second modulation parameters.

(B5) In any one of the methods denoted as (B1) through (B4), the second modulation parameters may include at least one of a bias value of the modulating light source, an amplification value of an intensity modulating signal of the modulating light source, an amplification value of a phase modulating signal of the modulating light source, and a phase difference between the intensity modulating signal and the phase modulating signal.

(C1) A method for tuning a power characteristic of optical frequency comb may include (a) controlling a modulating light source according to first modulation parameters to generate a first optical frequency comb including a plurality of first optical tones, (b) measuring power of each of the plurality of first optical tones, (c) determining that respective powers of the plurality of first optical tones are not within a predetermined proximity to respective target powers of the plurality of first optical tones, (d) in response to determining that the respective powers of the plurality of first optical tones are not within the predetermined proximity to the respective target powers of the plurality of first optical tones, generating second modulation parameters, (e) controlling the modulating light source according to the second modulation parameters to generate a second optical frequency comb including a plurality of second optical tones, (f) determining that respective powers of the plurality of second optical tones are within a predetermined proximity to respective target powers of the plurality of second optical tones, and (g) in response to determining that the respective powers of the plurality of second optical tones are within the predetermined proximity to the respective target powers of the plurality of second optical tones, continuing to control the modulating light source according the second modulation parameters.

(C2) In the method denoted as (C1), determining that the respective powers of the plurality of second optical tones are within the predetermined proximity to the respective target powers of the plurality of second optical tones may include (1) dividing the respective powers of the plurality of second optical tones by the respective target powers of the plurality of second optical tones, to generate respective power quotients of the plurality of second optical tones, (2) determining a coefficient of variation based at least partially on the respective power quotients of the plurality of second optical tones, (3) comparing the coefficient of variation to a maximum permissible coefficient of variation, and (4) determining that the respective powers of the plurality of second optical tones are within the predetermined proximity to the respective target powers of the plurality of second optical tones in response to the coefficient of variation being less than or equal to the maximum permissible coefficient of variation.

(C3) The method denoted as (C2) may further include, before dividing the respective powers of the plurality of second optical tones by the respective target powers of the plurality of second optical tones, sorting the plurality of second optical tones and the respective target powers of the plurality of second optical tones according to power level.

(C4) Any one of the methods denoted as (C1) through (C3) may further include (1) measuring power of each of the plurality of second optical tones and (2) determining that a total power of the plurality of second optical tones is greater than or equal to a minimum threshold value.

(C5) Any one of the methods denoted as (C1) through (C4) may further include determining the respective target powers of the plurality of second optical tones according to least one of link loss, receiver specifications, and modulation order, for each of the plurality of second optical tones.

(C6) In any one of the methods denoted as (C1) through (C5), the second modulation parameters may include at least one of a bias value of the modulating light source, an amplification value of an intensity modulating signal of the modulating light source, an amplification value of a phase modulating signal of the modulating light source, and a phase difference between the intensity modulating signal and the phase modulating signal.

Changes may be made in the above methods, devices, and systems without departing from the scope hereof. It should thus be noted that the matter contained in the above description and shown in the accompanying drawings should be interpreted as illustrative and not in a limiting sense. The following claims are intended to cover generic and specific features described herein, as well as all statements of the scope of the present method and system, which as a matter of language, might be said to fall therebetween.

What is claimed is:

1. A method for tuning a power characteristic of an optical frequency comb, comprising:
    (a) controlling a modulating light source according to a plurality of modulation parameters to generate an optical frequency comb including a plurality of optical tones;
    (b) changing at least one of the plurality of modulation parameters until a total power of the plurality of optical tones is greater than or equal to a minimum threshold value; and
    (c) generating a respective target power of each optical tone of the plurality of optical tones based on one or more characteristics of a respective communication network branch associated with the optical tone, at least two of the respective target powers of the plurality of optical tones being different from each other; and
    (d) changing at least one of the plurality of modulation parameters until respective powers of the plurality of optical tones are within a predetermined proximity to the respective target powers of the plurality of optical tones, at least partially by changing the at least one of the plurality of modulation parameters until a coefficient of variation is less than or equal to a maximum permissible coefficient of variation, the coefficient of variation expressing an extent that measured powers of the plurality of optical tones vary from the respective target powers of the plurality of optical tones.

2. The method of claim 1, wherein changing the at least one of the plurality of modulation parameters until the total power of the plurality of optical tones is greater than or equal to the minimum threshold value comprises regenerating a first one of the plurality of modulation parameters such that the first one of the plurality of modulation parameters has a random value.

3. The method of claim 2, wherein the random value is a random value within a predetermined range of values.

4. The method of claim 1, wherein changing the at least one of the plurality of modulation parameters until respective powers of the plurality of optical tones are within the predetermined proximity to the respective target powers of the plurality of optical tones comprises regenerating a first one of the plurality of modulation parameters such that the first one of the plurality of modulation parameters has a random value.

5. The method of claim 4, wherein the random value is a random value within a predetermined range of values.

6. The method of claim 1, wherein the plurality of modulation parameters comprises at least one of a bias value of the modulating light source, an amplification value of an intensity modulating signal of the modulating light source, an amplification value of a phase modulating signal of the modulating light source, and a phase difference between the intensity modulating signal and the phase modulating signal.

7. The method of claim 1, further comprising:
performing step (b) as a first control loop; and
performing step (d) as a second control loop including the first control loop.

8. The method of claim 1, further comprising determining the respective target powers of the plurality of optical tones according to least one of link loss, receiver specifications, and modulation order, for each of the plurality of optical tones.

9. A method for tuning a power characteristic of an optical frequency comb, comprising:
controlling a modulating light source according to first modulation parameters to generate a first optical frequency comb including a plurality of first optical tones;
measuring power of each of the plurality of first optical tones;
determining that a total power of the plurality of first optical tones is less than a minimum threshold value;
in response to determining that the total power of the plurality of first optical tones is less than the minimum threshold value, generating second modulation parameters;
controlling the modulating light source according to the second modulation parameters to generate a second optical frequency comb including a plurality of second optical tones;
measuring power of each of the plurality of second optical tones;
determining that a total power of the plurality of second optical tones is greater than or equal to the minimum threshold value;
generating a respective target power of each second optical tone of the plurality of second optical tones based on one or more characteristics of a respective communication network branch associated with the second optical tone, at least two of the respective target powers of the plurality of second optical tones being different from each other;
determining that respective powers of the plurality of second optical tones are within a predetermined proximity to the respective target powers of the plurality of second optical tones, in response to a coefficient of variation being less than or equal to a maximum permissible coefficient of variation, the coefficient of variation expressing an extent that measured powers of the plurality of second optical tones vary from the respective target powers of the plurality of second optical tones; and
in response to determining that the respective powers of the plurality of second optical tones are within the predetermined proximity to the respective target powers of the plurality of second optical tones, continuing to control the modulating light source according the second modulation parameters.

10. The method of claim 9, wherein generating the second modulation parameters comprises generating at least one of the second modulation parameters such that the at least one of the second modulation parameters has a random value.

11. The method of claim 9, wherein the second modulation parameters comprise at least one of a bias value of the modulating light source, an amplification value of an intensity modulating signal of the modulating light source, an amplification value of a phase modulating signal of the modulating light source, and a phase difference between the intensity modulating signal and the phase modulating signal.

12. A method for tuning a power characteristic of an optical frequency comb, comprising:
controlling a modulating light source according to first modulation parameters to generate a first optical frequency comb including a plurality of first optical tones;
measuring power of each of the plurality of first optical tones;
determining that a total power of the plurality of first optical tones is less than a minimum threshold value;
in response to determining that the total power of the plurality of first optical tones is less than the minimum threshold value, generating second modulation parameters;
controlling the modulating light source according to the second modulation parameters to generate a second optical frequency comb including a plurality of second optical tones;
measuring power of each of the plurality of second optical tones;
determining that a total power of the plurality of second optical tones is greater than or equal to the minimum threshold value;
determining that respective powers of the plurality of second optical tones are within a predetermined proximity to respective target powers of the plurality of second optical tones; and
in response to determining that the respective powers of the plurality of second optical tones are within the predetermined proximity to the respective target powers of the plurality of second optical tones, continuing to control the modulating light source according the second modulation parameters;
wherein determining that the respective powers of the plurality of second optical tones are within the predetermined proximity to the respective target powers of the plurality of second optical tones includes:
dividing the respective powers of the plurality of second optical tones by the respective target powers of the plurality of second optical tones, to generate respective power quotients of the plurality of second optical tones,
determining a coefficient of variation based at least partially on the respective power quotients of the plurality of second optical tones,
comparing the coefficient of variation to a maximum permissible coefficient of variation, and
determining that the respective powers of the plurality of second optical tones are within the predetermined proximity to the respective target powers of the plurality of second optical tones in response to the coefficient of variation being less than or equal to the maximum permissible coefficient of variation.

13. The method of claim 12, further comprising, before dividing the respective powers of the plurality of second optical tones by the respective target powers of the plurality of second optical tones, sorting the plurality of second optical tones and the respective target powers of the plurality of second optical tones according to power level.

14. A method for tuning a power characteristic of an optical frequency comb, comprising:

controlling a modulating light source according to first modulation parameters to generate a first optical frequency comb including a plurality of first optical tones;

measuring power of each of the plurality of first optical tones;

generating a respective target power of each first optical tone of the plurality of first optical tones based on one or more characteristics of a respective communication network branch associated with the first optical tone, at least two of the respective target powers of the plurality of first optical tones being different from each other;

determining that respective powers of the plurality of first optical tones are not within a predetermined proximity to the respective target powers of the plurality of first optical tones;

in response to determining that the respective powers of the plurality of first optical tones are not within the predetermined proximity to the respective target powers of the plurality of first optical tones, generating second modulation parameters;

controlling the modulating light source according to the second modulation parameters to generate a second optical frequency comb including a plurality of second optical tones;

determining that respective powers of the plurality of second optical tones are within a predetermined proximity to respective target powers of the plurality of second optical tones, in response to a coefficient of variation being less than or equal to a maximum permissible coefficient of variation, the coefficient of variation expressing an extent that measured powers of the plurality of second optical tones vary from the respective target powers of the plurality of second optical tones; and in response to determining that the respective powers of the plurality of second optical tones are within the predetermined proximity to the respective target powers of the plurality of second optical tones, continuing to control the modulating light source according the second modulation parameters.

15. The method of claim 14, further comprising:

measuring power of each of the plurality of second optical tones; and determining that a total power of the plurality of second optical tones is greater than or equal to a minimum threshold value.

16. The method of claim 14, further comprising determining the respective target powers of the plurality of second optical tones according to least one of link loss, receiver specifications, and modulation order, for each of the plurality of second optical tones.

17. The method of claim 14, wherein the second modulation parameters comprise at least one of a bias value of the modulating light source, an amplification value of an intensity modulating signal of the modulating light source, an amplification value of a phase modulating signal of the modulating light source, and a phase difference between the intensity modulating signal and the phase modulating signal.

18. A method for tuning a power characteristic of an optical frequency comb, comprising:

controlling a modulating light source according to first modulation parameters to generate a first optical frequency comb including a plurality of first optical tones;

measuring power of each of the plurality of first optical tones;

determining that respective powers of the plurality of first optical tones are not within a predetermined proximity to respective target powers of the plurality of first optical tones;

in response to determining that the respective powers of the plurality of first optical tones are not within the predetermined proximity to the respective target powers of the plurality of first optical tones, generating second modulation parameters;

controlling the modulating light source according to the second modulation parameters to generate a second optical frequency comb including a plurality of second optical tones;

determining that respective powers of the plurality of second optical tones are within a predetermined proximity to respective target powers of the plurality of second optical tones; and in response to determining that the respective powers of the plurality of second optical tones are within the predetermined proximity to the respective target powers of the plurality of second optical tones, continuing to control the modulating light source according the second modulation parameters;

wherein determining that the respective powers of the plurality of second optical tones are within the predetermined proximity to the respective target powers of the plurality of second optical tones includes:

dividing the respective powers of the plurality of second optical tones by the respective target powers of the plurality of second optical tones, to generate respective power quotients of the plurality of second optical tones, determining a coefficient of variation based at least partially on the respective power quotients of the plurality of second optical tones, comparing the coefficient of variation to a maximum permissible coefficient of variation, and determining that the respective powers of the plurality of second optical tones are within the predetermined proximity to the respective target powers of the plurality of second optical tones in response to the coefficient of variation being less than or equal to the maximum permissible coefficient of variation.

19. The method of claim 18, further comprising, before dividing the respective powers of the plurality of second optical tones by the respective target powers of the plurality of second optical tones, sorting the plurality of second optical tones and the respective target powers of the plurality of second optical tones according to power level.

\* \* \* \* \*

UNITED STATES PATENT AND TRADEMARK OFFICE
CERTIFICATE OF CORRECTION

| | |
|---|---|
| PATENT NO. | : 11,784,719 B1 |
| APPLICATION NO. | : 17/220616 |
| DATED | : October 10, 2023 |
| INVENTOR(S) | : Lin Cheng et al. |

It is certified that error appears in the above-identified patent and that said Letters Patent is hereby corrected as shown below:

In the Claims

Column 12, Line 33, "value; and" should read --value;--

Signed and Sealed this
Thirtieth Day of July, 2024

Katherine Kelly Vidal
*Director of the United States Patent and Trademark Office*